(12) United States Patent
Lira

(10) Patent No.: US 10,182,523 B2
(45) Date of Patent: Jan. 22, 2019

(54) SELF-PROPELLED, MULTIPLE-USE TRANSFER DEVICE WITH FEED SPREADER

(71) Applicant: Devocir Antônio Lira, Caarapó-Mato Grosso Do Sul (BR)

(72) Inventor: Devocir Antônio Lira, Caarapó-Mato Grosso Do Sul (BR)

( * ) Notice: Subject to any disclaimer, the term of this patent is extended or adjusted under 35 U.S.C. 154(b) by 0 days.

(21) Appl. No.: 15/523,779

(22) PCT Filed: Dec. 3, 2014

(86) PCT No.: PCT/BR2014/050026
§ 371 (c)(1),
(2) Date: Oct. 11, 2017

(87) PCT Pub. No.: WO2016/070249
PCT Pub. Date: May 12, 2016

(65) Prior Publication Data
US 2018/0054959 A1 Mar. 1, 2018

(30) Foreign Application Priority Data

Nov. 7, 2014 (BR) .......................... 10 2014 027838

(51) Int. Cl.
*A01C 15/00* (2006.01)
*B60P 1/36* (2006.01)
(Continued)

(52) U.S. Cl.
CPC ............ *A01C 15/003* (2013.01); *A01C 15/18* (2013.01); *B60P 1/36* (2013.01); *B60P 1/40* (2013.01);
(Continued)

(58) Field of Classification Search
CPC ......... A01C 15/003; A01C 15/18; A01C 3/06; B60P 1/38; B60P 1/40; B65G 17/12; B65G 23/06; B65G 33/14; B65G 33/34
(Continued)

(56) References Cited

U.S. PATENT DOCUMENTS 3,507,452 A * 4/1970 Dreyer .................... A01C 3/06
239/673
4,106,643 A * 8/1978 McGehee ............. A01C 15/00
220/653

(Continued)

FOREIGN PATENT DOCUMENTS

| CA | 2203705 A1 | 10/1998 |
| KR | 2002-0073730 A | 9/2002 |
| KR | 10-2010-0069111 A | 6/2010 |

OTHER PUBLICATIONS

International Search Report of PCT/BR2014/050026, dated Feb. 5, 2015. [PCT/ISA/210].

*Primary Examiner* — Kaitlin S Joerger
(74) *Attorney, Agent, or Firm* — Sughrue Mion, PLLC

(57) ABSTRACT

"SELF-PROPELLED, MULTI-PURPOSE TRANSFER DEVICE", as described in the report and in the attached illustrations, is an equipment used in general agriculture and livestock activities to transfer products to another suitable equipment or place, containing the additional function of spreading products in the soil, therefore called self-propelled. The equipment presents as a differential the fact that it brings together multiple functions such as the possibility of transferring and spreading products in the field or in other applications, such as in sandpits.

3 Claims, 8 Drawing Sheets

Figure 1:
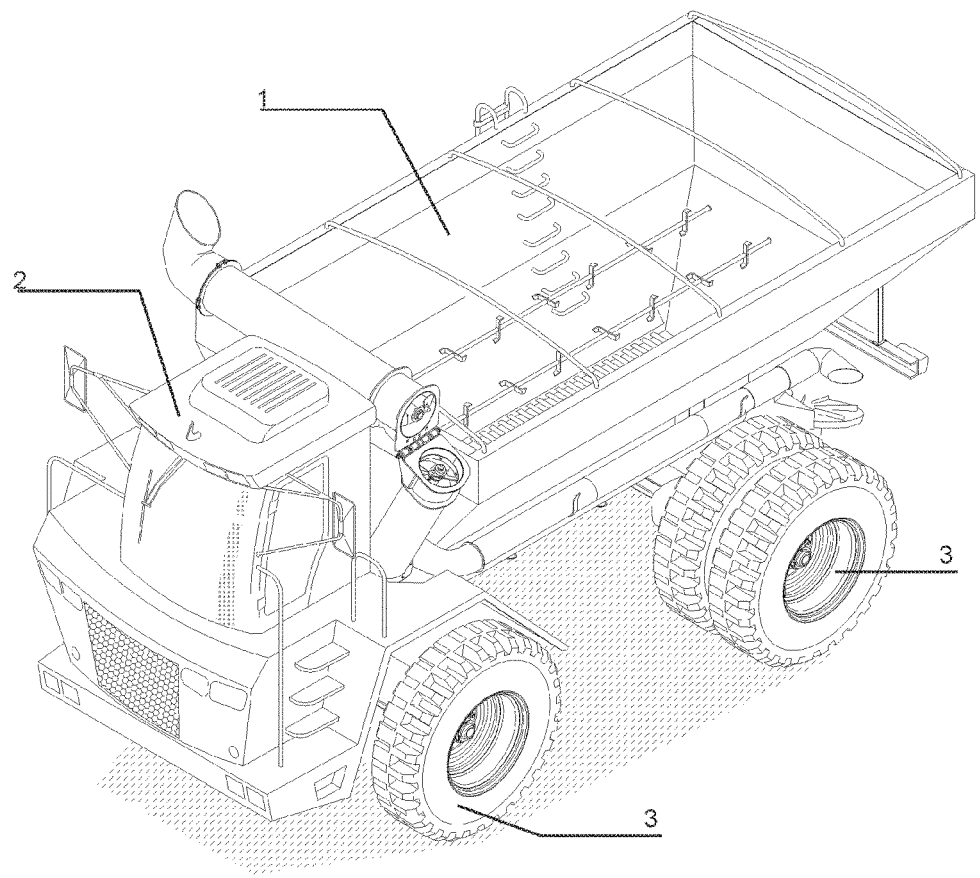

(51) Int. Cl.
*A01C 15/18* (2006.01)
*B60P 1/40* (2006.01)
*B65G 17/12* (2006.01)
*B65G 23/06* (2006.01)
*B65G 33/14* (2006.01)
*B65G 33/34* (2006.01)
*B65G 47/82* (2006.01)
*A01C 3/06* (2006.01)

(52) U.S. Cl.
CPC ............ *B65G 17/12* (2013.01); *B65G 23/06* (2013.01); *B65G 33/14* (2013.01); *B65G 33/34* (2013.01); *B65G 47/82* (2013.01); *A01C 3/066* (2013.01)

(58) Field of Classification Search
USPC .................................................. 414/501, 505
See application file for complete search history.

(56) References Cited

U.S. PATENT DOCUMENTS

| | | | | |
|---|---|---|---|---|
| 4,160,621 A * | 7/1979 | Bishop | ...................... | B60P 1/38 37/142.5 |
| 4,405,089 A * | 9/1983 | Taylor | ...................... | B60P 1/38 239/656 |
| 5,466,112 A * | 11/1995 | Feller | ...................... | B60P 1/16 239/657 |
| 5,658,116 A * | 8/1997 | Krull | ...................... | B60P 1/40 105/282.3 |
| 5,669,531 A * | 9/1997 | Hagemeyer | ............... | B60P 1/40 198/671 |
| 6,585,472 B2 * | 7/2003 | Hollinrake | ................ | B60P 1/16 414/489 |
| 7,393,275 B2 * | 7/2008 | Voss | ................... | A01D 41/1217 414/526 |
| 9,931,971 B1 * | 4/2018 | Null | ...................... | B60P 1/38 |
| 2001/0046432 A1 * | 11/2001 | Hollinrake | ................ | B60P 1/16 414/528 |
| 2005/0279979 A1 * | 12/2005 | Feller | ...................... | B60P 1/16 254/323 |
| 2008/0156907 A1 * | 7/2008 | Tremblay | ............. | A01C 15/007 239/656 |
| 2009/0136330 A1 * | 5/2009 | Feller | ...................... | B60P 1/16 414/489 |
| 2012/0168539 A1 * | 7/2012 | Kim | ..................... | A01C 15/007 239/663 |
| 2018/0054959 A1 * | 3/2018 | Lira | ..................... | A01C 15/003 |

* cited by examiner

Detail A

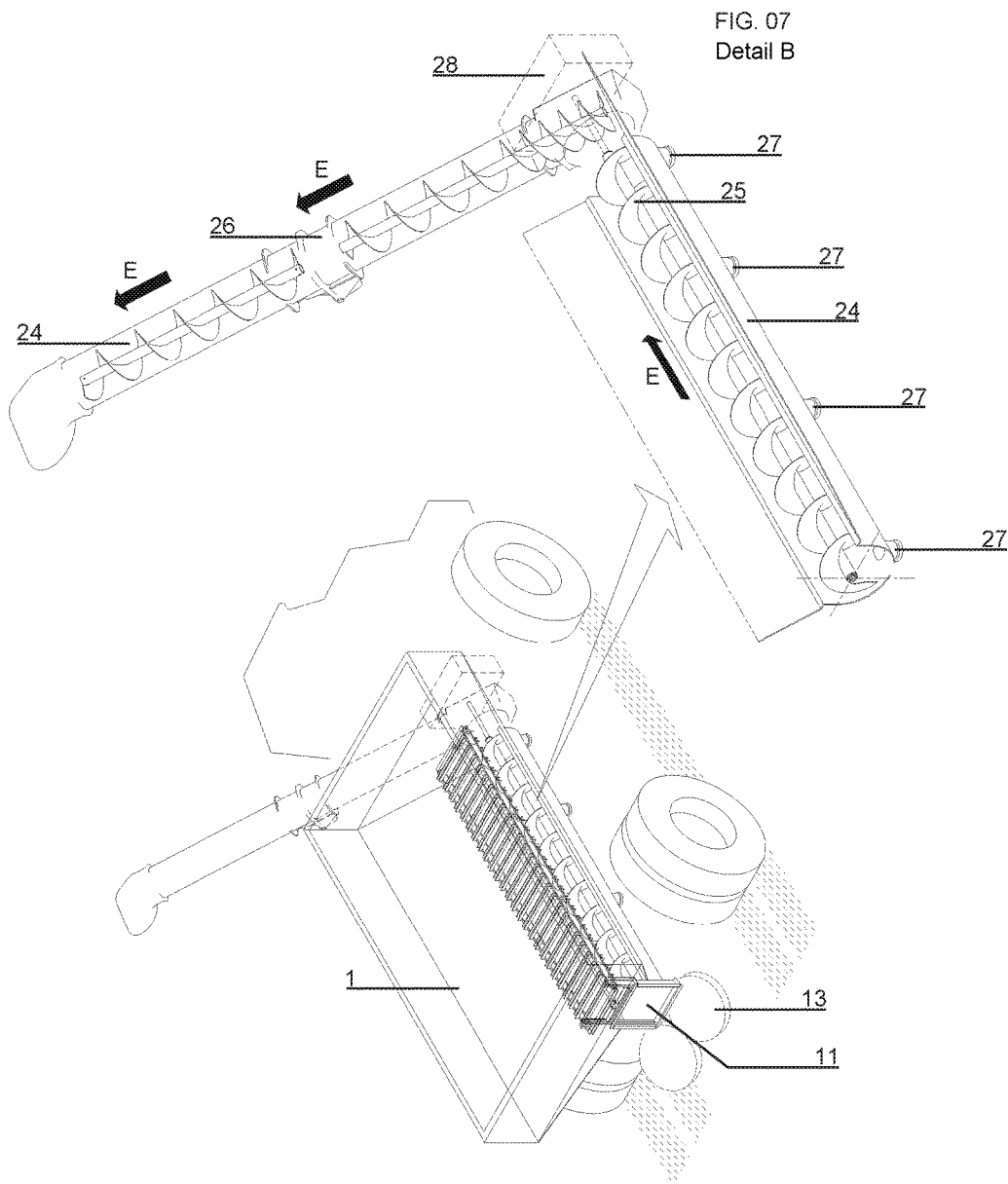

SELF-PROPELLED, MULTIPLE-USE TRANSFER DEVICE WITH FEED SPREADER

SUBJECT

The present Invention Patent refers to an apparatus used in agriculture and livestock generally for transferring products from its interior to another suitable equipment or place, containing the additional function of spreading products in the soil, therefore called self-propelled. The equipment presents as a differential the fact that it brings together multiple functions such as the possibility of transferring and spreading products in the field or in other applications, like sandpits.

STATE OF THE ART

The state of the art acknowledges equipment having the function of transferor or spreader, in an individualized way, requiring an equipment to perform each function.

Such known equipment used to spread soil inputs, for example limestone or manure, among others, are usually towed by tractors or animal traction, and do not have the self-propelling means. Some spreaders equipment which have the means of self-propulsion are known, but these do not have the possibility to perform other functions in the same equipment. There are also bodies adapted to spread inputs in trucks, but these compact the ground because its set of tires is not adapted for farming and the equipment as a whole is very heavy. In the same way, the equipment that transfer inputs used in the field are towed generally by tractors, because they are equipment of great size.

The constructive form of the transfer device, that determines their movement in a towed way means that, in crops, it is necessary to move a tractor to take and fetch the transfer device from the equipment used in planting and harvesting, for example, sometimes preventing a tractor from doing other functions in order to tow the transfer device. In addition, the operator of the tractor does not visualize where the load is being placed on the transfer device at the time of loading, which often causes uneven distribution. It overloads one part more than the other, making it difficult to move and causing damage to the equipment, which may even cause the its tipping due to the irregular soil of the crops. This occurs due to the fact that the operator stays far ahead of the transfer device, in the tractor that tows it, not having enough height to visualize the loading operation. In the operation of transferring the load the same situation occurs, requiring an auxiliary person to correctly indicate the unloading place.

Concerning the constructive form of the sprinklers of inputs, in the same way, as these are towed, it is necessary that a tractor, in general, is made available for its movement, preventing it from carrying out other tasks. On larger properties, the movement of a tractor to spread inputs leads to delays in other activities as important as, or requires availability of more tractors so the activity of spreading inputs does not interfere the rest of the tasks.

In this way, it is not acknowledged by the art a self-propelled equipment that gathers functions of load transfer and input spreader.

INVENTIVE CONCEPT

The present Self-propelled, multi-purpose transfer device is based on the inventive concept of bringing together in a single self-propelled equipment the functions of load transfer and input spreader.

The main advantage of unifying these functions in a single self-propelled equipment is to give greater agility to the field activities, since it is not necessary to move a tractor for this purpose. In addition, the productive cost is reduced, precisely because it is not necessary to use a tractor next to the tow truck.

It also important to highlight the versatility of the equipment. With multiple use, it can perform several activities on a single property, such as transferor of harvests, fertilizers or any other necessary load, and input spreader (in general limestone and fertilizers, as well as others).

Although the design of the equipment has as its main objective the activities in the field, agriculture or livestock, it can also be used in other activities, such as in the sandpits, as a transferor of sand loads.

FIELD OF APPLICATION

The application of the present Self-propelled, multi-purpose transfer device occurs as an agricultural equipment.

Advantages

The Self-propelled, multi-purpose transfer device presents as advantages:

Enables the execution of the functions of load transfer and input spreader in a single equipment, which offers greater agility in the tasks that need to be carried out in the field;

Provides a lower cost of production because it is not necessary to use a tractor to tow the transfer device and spreader equipment;

Because the operator has visual contact with the products when they are being loaded, it can better position the equipment for distribution of the load inside the equipment. In addition, an auxiliary person is not required to carry out the distribution of the load, giving full autonomy to the operator;

Flexibility of use, because the equipment can serve as a transferor of several different loads and also be used as a spreader of several different inputs in agriculture or livestock;

It can also be used in other ways, such as in sandpits, as sand transferor;

Due to its constructive form, the load to be transferred can be discharged by the conveyor belt and corn heads, or by the lower spreader device, which confers versatility to the equipment, as the load can be handled the best way possible;

Provides greater security to the operation, since the driver has visual contact with the load, allowing its proper distribution and preventing tipping situations; and Because it contains an internal decompressor, the inputs are spread with higher quality and uniformity. In situations where the load stays in the reservoir for some time before being transferred or spread, the natural compaction occurs by its own weight or humidity, which makes it difficult for the conveyor belt to collect it.

ILLUSTRATIONS

Figure 2:
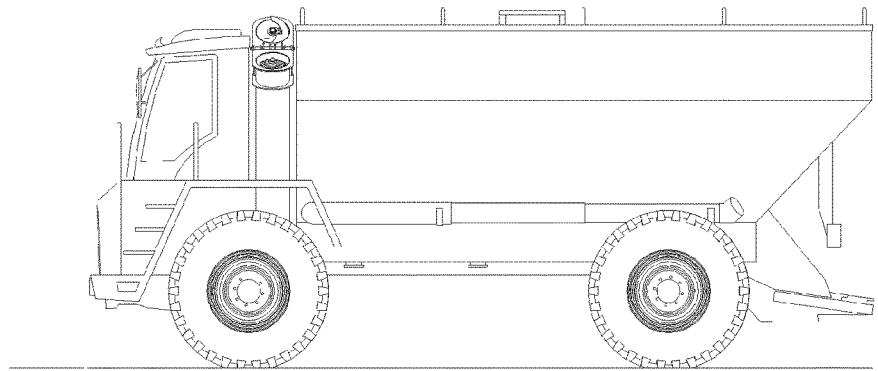
Figure 3:
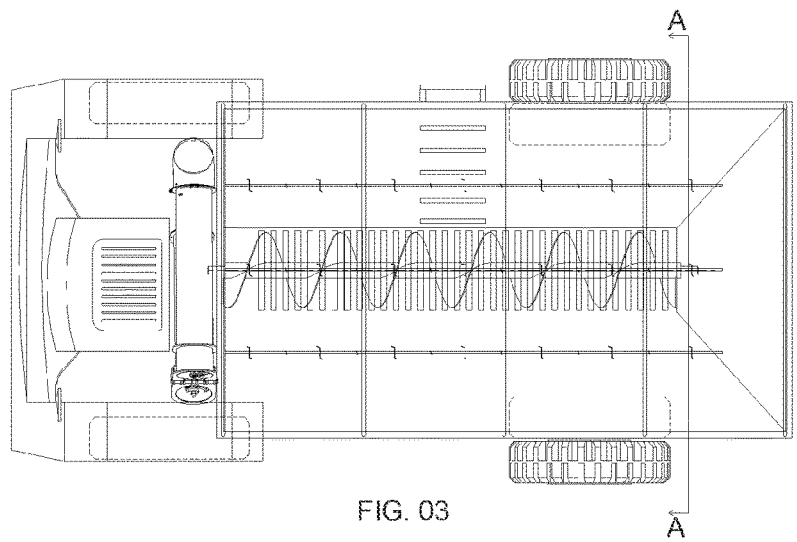
Figure 4:
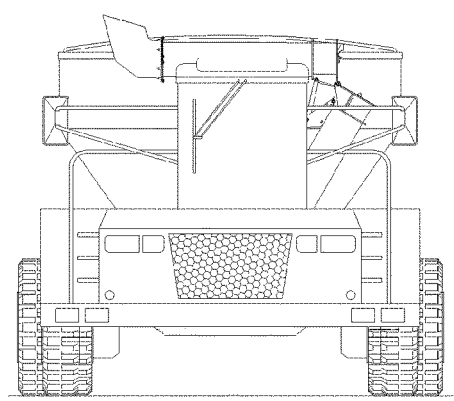
Figures 5, 6:
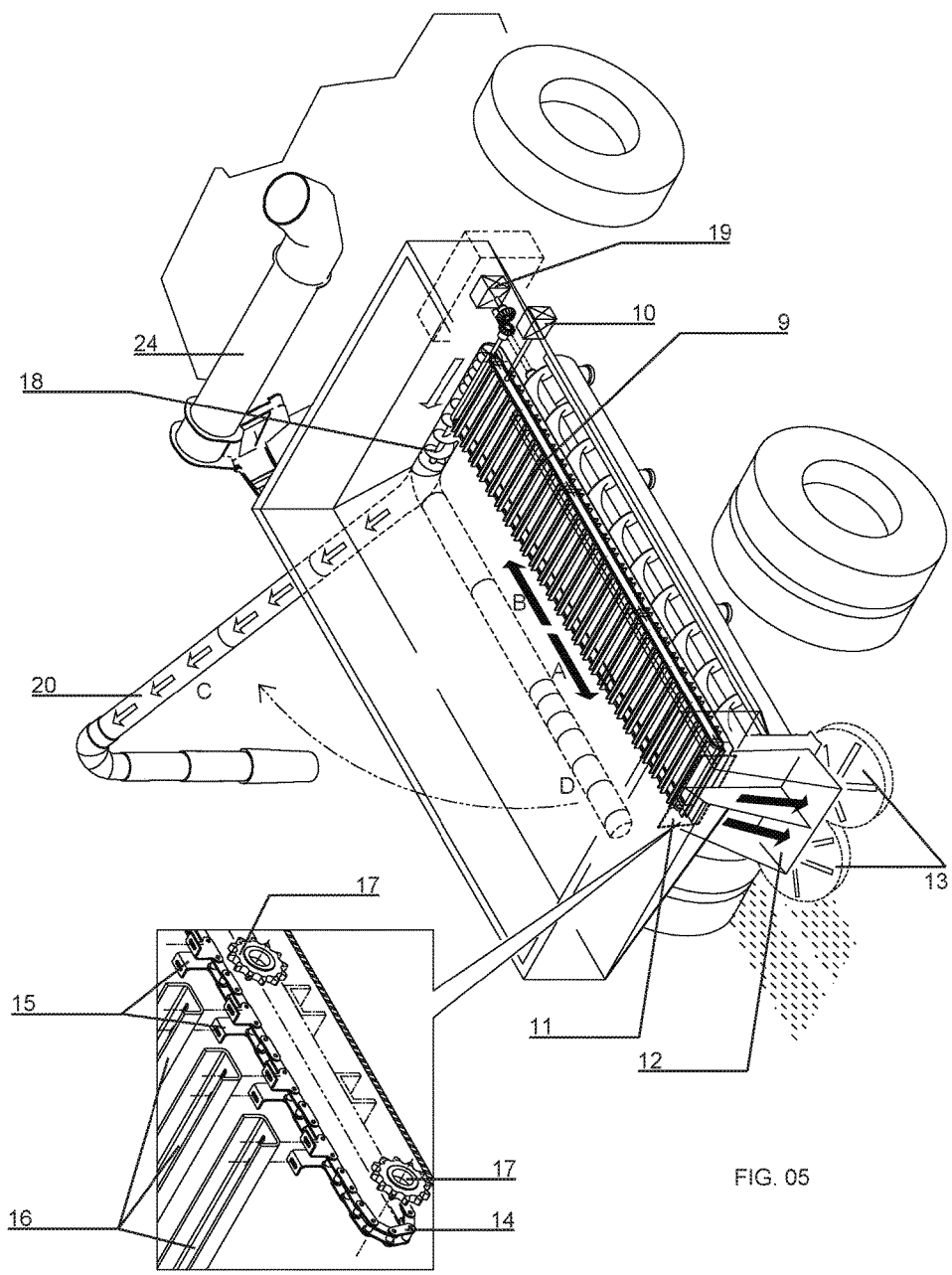
Figure 9:
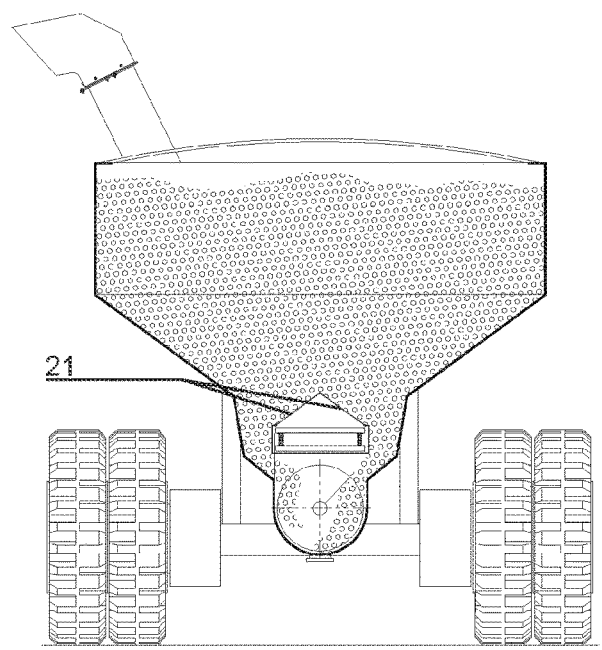
Figure 10:
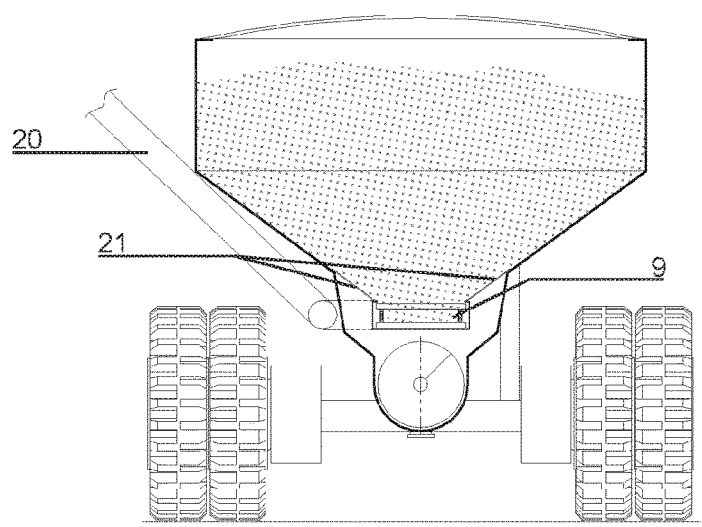
Figure 11:
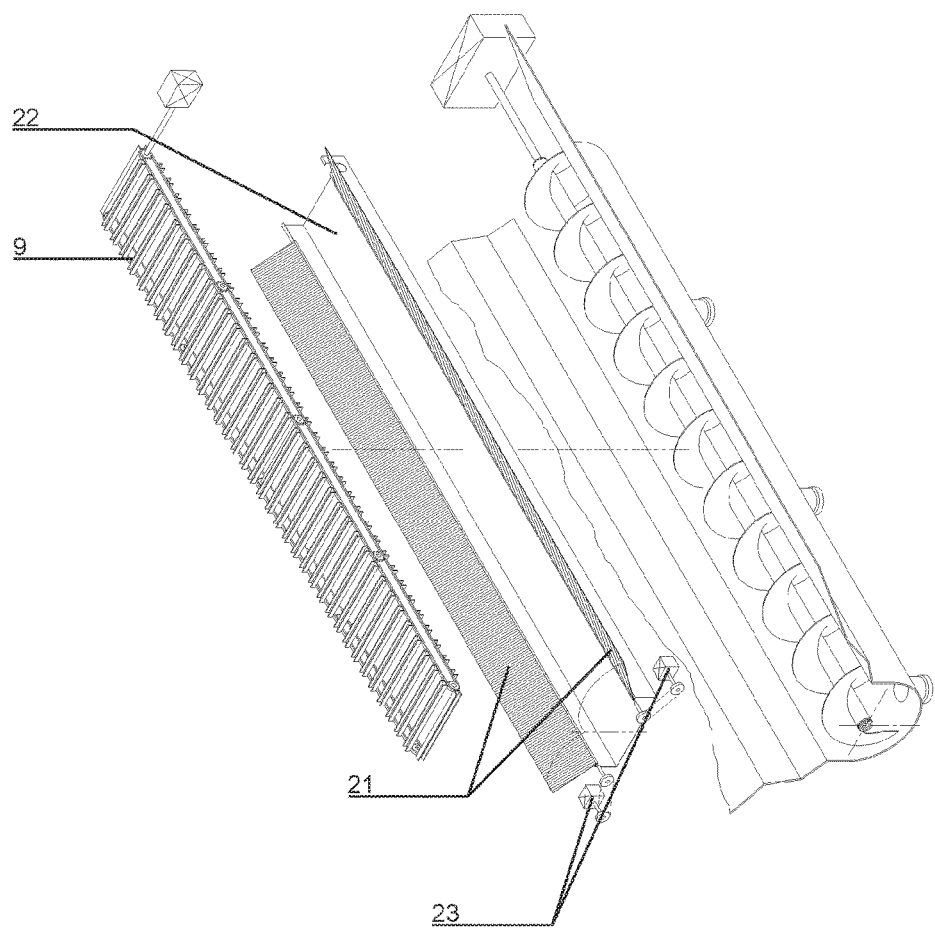
Figure 12:
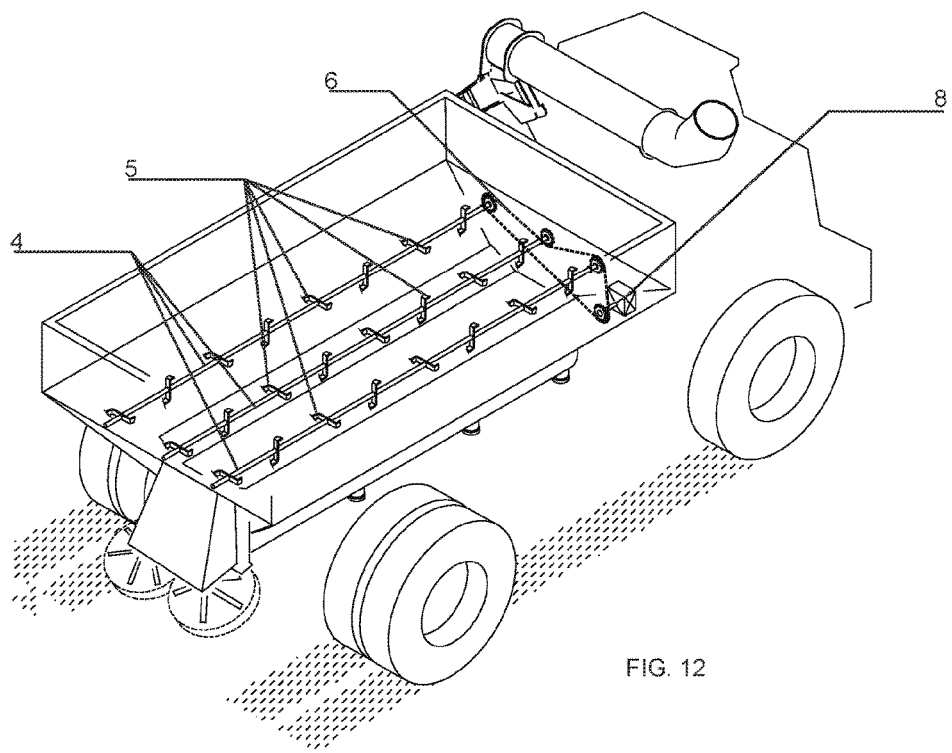
Figure 13:
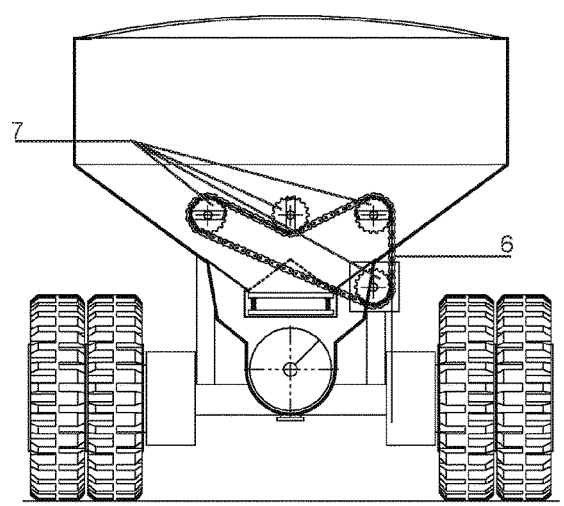
Figure 14:
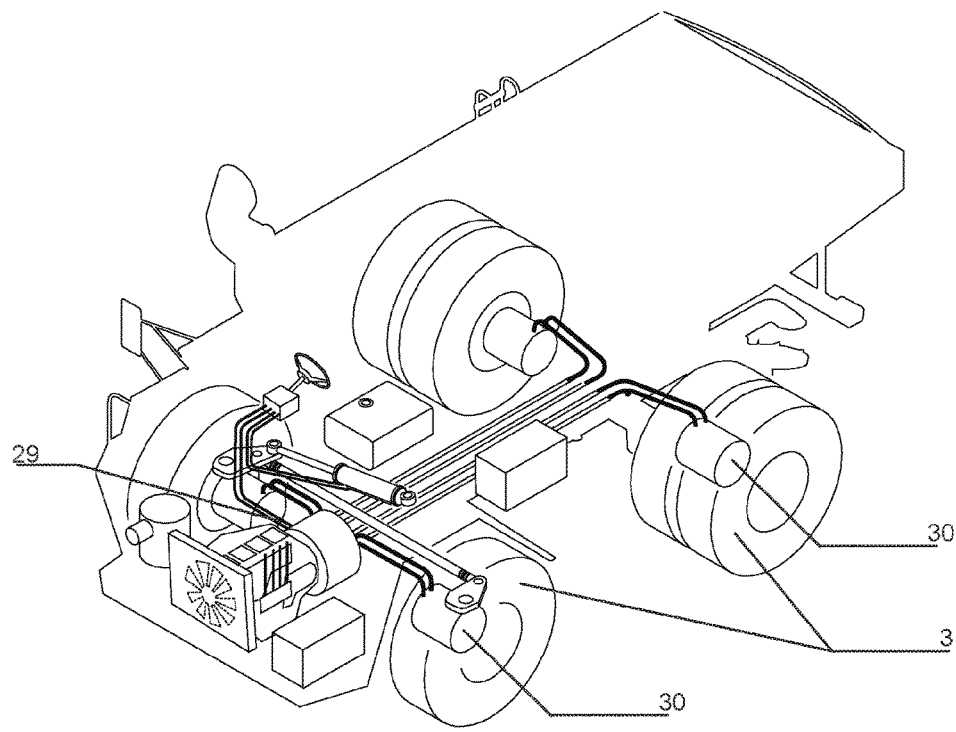
Figure 15:
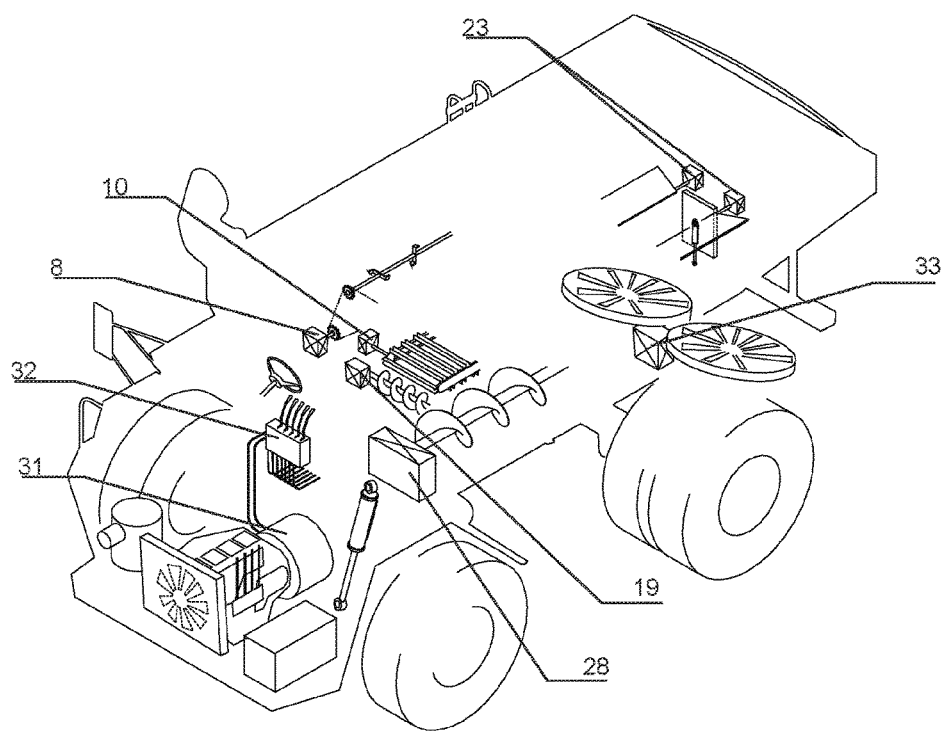

In order to facilitate the research and provide understanding of the present invention and according to a basic and preferential execution way developed by the applicant, we reference the illustrations attached, which integrate and support the present descriptive report, where it:

FIG. 01—Presents the front perspective of the transfer device;

FIG. 02—Presents the left side of the transfer device;

FIG. 03—Presents the top of the transfer device;

FIG. 04—Presents the front view of the transfer device;

FIG. 05—Presents the back perspective of the transfer device;

FIG. 06—Presents the Detail A;

FIG. 07—Presents the Detail B;

FIG. 08—Presents the back perspective showing the transfer device's conveyor belt;

FIG. 09—Presents the Cut A-A showing the grain unloading from the bottom;

FIG. 10—Presents Cut A-A showing the unloading of inputs by the spreader;

FIG. 11—Presents the exploded perspective of the unloading device by the corn heads;

FIG. 12—Presents the back perspective of the transfer device showing the internal decompressor;

FIG. 13—Presents the back view of the transfer device showing the internal decompressor mechanism;

FIG. 14—Presents the back perspective of the transfer device showing the self-propelled hydraulic system;

FIG. 15—Presents the back perspective of the transfer device showing the hydraulic system and drive motors of the mechanisms.

DESCRIPTION

The transfer device is composed by the product reservoir (1) attached to the operator's cabin (2) constituting a single equipment with full wheel assemblies (3) for its movement. The operator's cabin is constructed in such a way that it is possible to visualize the packaging of the products inside the product reservoir (1).

General products, such as grains, fertilizers or limestone are deposited inside the product reservoir (1) by other equipment, such as harvesters, trucks, cranes, loaders, backhoe loaders and others.

The inputs, such as fertilizers, humus, gypsum, phosphorus, potassium, limestone and others can be spread directly on the soil or discharged to any other equipment. Before, however, these inputs must be decompressed so that they can be moved easily by the conveyor belt.

The decompression takes place through the axes (4) provided with decompression levers (5) simultaneously moved by the chain (6) and the sprockets (7). The activation occurs through the power socket (8). The decompression levers (5) have the function of stirring the inputs so that the conveyor belt can carry them.

The soil spreading occurs through the conveyor belt (9) which is activated by the power socket (10), that has a double direction of movement. For soil spreading, the conveyor belt moves in the direction A so that the inputs pass through the back gate (11) and the flow divider (12), falling on the circular spreaders (13), which have the function of distributing the inputs on the soil's surface.

The conveyor belt (9) is constituted by chain (14) provided with L-shaped salience (15) where the container pallet transporters (16) are fixed. The continuous movement of the chain (14) occurs through the sprockets (17).

The unloading of the inputs to another equipment, in order to supply a planter, for example, occurs through the conveyor belt (9) that moves in the direction B so that the inputs fall into the corn heads (18) activated by the power socket (19), being directed to the unloading telescopic articulated duct (20), which can be positioned in any way necessary. For that, the unloading telescopic articulated duct (20) is positioned as in C, and when not used, it is positioned as in D, retracting the telescopic hinges.

In order to carry out any of the input unloading forms by direct spreading on the soil or through the unloading telescopic articulated duct (20), the sheets (21) of the tray (22) that confine the conveyor belt (9) must be open so that the inputs can be contacted and transported by the conveyor belt (9). The activation of the selection plates movements occurs through the power sockets (23) and it is only possible when the equipment is empty.

The transfer of grains or other products from the interior of the product reservoir (1) is carried out by the articulated duct (24) provided internally with the corn heads (25), whose load and unload of the products occurs in the direction E. The articulated duct (24) has a central hinge (26) for the purpose of enabling the accommodation of its upper portion closest to the operator's cabin (2). The horizontal portion of the articulated duct (24) has nozzles (27) for periodic cleaning. The activation of the corn heads (25) occurs through the hydraulic power unit (28) or by gearboxes.

For the transfer of grains or other products from the interior of the product reservoir (1) through the articulated duct (24) it is necessary that the tray's sheets (21) are closed so that the products fall over the corn heads (25).

The transfer device has and engine driven by diesel (29), preferably for activation of hydraulic motors (30) in order to move the complete set of wheels (3). The hydraulic motors (30) can be replaced by transmission through gearboxes and differential crown wheel and pinion.

The control of the various mechanisms occurs from the hydraulic pump (31) interconnected to the hydraulic control valve (32) which activates and deactivates the power sockets (8), (10), (19), (23), the power sockets (33) for activation of the circular spreaders (13) and the hydraulic power unit (28). The hydraulic pump assembly (31) and the hydraulic control valve (32) can be replaced by transmission through gearboxes and differential crown wheel and pinion.

The equipment can optionally contain a third axis resulting in 6×4 traction.

CONCLUSION

Thereby, the Self-propelled, Multi-purpose Transfer Device is subsidized by unpublished technical and functional characteristics, thus deserving the legal protection requested.

The invention claimed is:

1. A SELF-PROPELLED, MULTI-PURPOSE TRANSFER DEVICE composed by a product reservoir (1) attached to an operator's cabin (2) with a complete set of wheels (3) and driven by a diesel engine (29), and that is characterized by the combination of the functions of a transferor and a spreader of products and the decompression of inputs occurs through decompression levers (5) of axes (4) driven by a chain (6) and sprockets (7); a conveyor belt (9) driven by a power socket (10) and moving in a direction A spreads inputs into soil by a back gate (11) while a flow divider (12) spreads inputs through the circular spreaders (13) driven by a power socket (33); the conveyor belt (9) is constituted by a chain (14) and moved by sprockets (17) provided with L-shaped salience (15) where container pallet transporters (16) are fixed; for the unloading of inputs, the conveyor belt (9) moves in a direction B so that inputs fall into corn heads (18) activated by a power socket (19), directing the inputs to an unloading telescopic articulated duct (20) positioned as in C (when not used, the unloading telescopic articulated duct (20) is positioned as in D); sheets (21) of a tray (22) when activated by other power sockets (23) remain open for the unloading; The transfer of grains or other products from an interior of the product reservoir (1) is carried out by the unloading telescopic articulated duct (24) provided internally with corn heads (25), whose loading and unloading occurs in a direction E, activated by a hydraulic power unit (28); in addition, the unloading telescopic articulated duct (24) has nozzles (27) for periodic cleaning; For the transfer of grains, sheets (21) of the tray (22) activated by the power sockets (23) remain closed; the diesel engine (29) promotes activation of hydraulic engines (30) in order to move the complete set of wheels (3); the control of the mechanisms occurs from a hydraulic pump (31) interconnected to a hydraulic control valve (32) which activates the power sockets (8), (10), (19), (23), and hydraulic power unit (28).

2. The SELF-PROPELLED, MULTI-PURPOSE TRANSFER DEVICE, as claimed in 1 is characterized by hydraulic pump (31) and hydraulic control valve (32) being replaced by transmission through gearboxes and a differential crown wheel and a pinion.

3. The SELF-PROPELLED, MULTI-PURPOSE TRANSFER DEVICE, as claimed in 1 is characterized by the option of containing a third axis resulting in 6×4 traction.

* * * * *